US009481319B2

(12) United States Patent
Gatton

(10) Patent No.: US 9,481,319 B2
(45) Date of Patent: Nov. 1, 2016

(54) TV MOUNT FOR OVER-THE-ROAD TRUCK

(71) Applicant: Avery A. Gatton, New Sharon, IA (US)

(72) Inventor: Avery A. Gatton, New Sharon, IA (US)

( * ) Notice: Subject to any disclaimer, the term of this patent is extended or adjusted under 35 U.S.C. 154(b) by 0 days.

(21) Appl. No.: 14/727,939

(22) Filed: Jun. 2, 2015

(65) Prior Publication Data

US 2015/0343964 A1 Dec. 3, 2015

Related U.S. Application Data

(60) Provisional application No. 62/006,303, filed on Jun. 2, 2014.

(51) Int. Cl.
*B60R 11/02* (2006.01)
*B62D 33/06* (2006.01)
*B60R 11/00* (2006.01)

(52) U.S. Cl.
CPC ....... *B60R 11/0235* (2013.01); *B62D 33/0612* (2013.01); *B60R 2011/008* (2013.01); *B60R 2011/0028* (2013.01); *Y10T 29/49828* (2015.01)

(58) Field of Classification Search
CPC .............. B60R 11/02; B60R 11/0252; B60R 11/0229; B60R 11/0235; B60R 2011/0028; B60R 2011/0049; B60R 2011/008; B60R 2011/0082; B60R 2011/0084; B60R 2011/0085; B60R 2011/0276; B60R 2011/0288; B62D 33/06; B62D 33/0612
USPC .............................. 296/190.02, 37.07, 37.08; 224/539–541, 543, 321, 311; 348/837; 248/917–924
See application file for complete search history.

(56) References Cited

U.S. PATENT DOCUMENTS

| | | | | |
|---|---|---|---|---|
| 4,144,601 A | * | 3/1979 | Anderson | B62D 33/0612 105/316 |
| 6,783,105 B2 | * | 8/2004 | Oddsen, Jr. | F16M 11/04 248/279.1 |
| 7,950,613 B2 | * | 5/2011 | Anderson | F16M 13/02 248/282.1 |
| 2005/0127253 A1 | * | 6/2005 | Kim | B60R 11/0235 248/176.1 |
| 2006/0262189 A1 | * | 11/2006 | Boundy | B60R 11/0235 348/148 |
| 2007/0145219 A1 | * | 6/2007 | Lin | B60R 11/02 248/274.1 |
| 2007/0174997 A1 | * | 8/2007 | Lu | B60R 11/0235 16/367 |
| 2008/0029669 A1 | * | 2/2008 | Olah | B60R 11/0229 248/276.1 |
| 2009/0289159 A1 | * | 11/2009 | O'Keene | F16M 11/10 248/225.11 |
| 2010/0102942 A1 | * | 4/2010 | Bisinger | B60P 3/36 340/425.5 |
| 2011/0051030 A1 | * | 3/2011 | Chen | B60R 11/0235 349/58 |
| 2012/0018475 A1 | * | 1/2012 | Cooper | B60R 11/02 224/401 |
| 2013/0174660 A1 | * | 7/2013 | Imasaka | B60R 11/02 73/493 |
| 2014/0145051 A1 | * | 5/2014 | Gwag | B60R 11/02 248/298.1 |
| 2015/0138449 A1 | * | 5/2015 | Rawlinson | G06F 3/1454 348/837 |
| 2015/0323794 A1 | * | 11/2015 | Mikami | G02B 27/0149 359/630 |
| 2015/0343962 A1 | * | 12/2015 | Le Leizour | B60R 11/02 361/809 |
| 2015/0343964 A1 | * | 12/2015 | Gatton | B60R 11/0235 296/190.02 |

* cited by examiner

*Primary Examiner* — Gregory Blankenship
(74) *Attorney, Agent, or Firm* — McKee, Voorhees & Sease, PLC

(57) ABSTRACT

A bracket assembly adjustably mounted a flat screen TV monitor in the sleeper compartment of an over-the-road truck. The bracket base mounts to the ceiling of the truck cab and to the front wall of the sleeper compartment. An arm is slidably connected to the base. The TV is mounted to a plate on the end of the arm so as to reside in the entry/exit opening between the cab and the sleeper compartment. The TV can be moved between a raised position and a lowered position.

20 Claims, 3 Drawing Sheets

TV MOUNT FOR OVER-THE-ROAD TRUCK

CROSS REFERENCE TO RELATED APPLICATIONS

This application claims priority under 35 U.S.C. §119 to provisional applications U.S. Ser. No. 62/006,303 filed Jun. 2, 2014, herein incorporated by reference in its entirety.

BACKGROUND OF THE INVENTION

Over the road trucks typically include a tractor with a cab and sleeping compartment. Drivers often have TVs to watch when they are not driving. Space in the cab and sleeping compartment is limited. Flat panel TVs which require much less space than box cathode ray TVs are popular, since the truck driver can have a larger screen size utilizing minimal space in the cab or sleeper. However, placement of the flat panel TVs remains problematic. Often, the TV is positioned near the access opening between the cab and the sleeper compartment. However, this placement narrows the opening and makes passage through the opening more difficult. Also, some sleeper cabs have bunk beds, such that a TV cannot be placed at the foot of the beds and still be viewed from both bunks.

Accordingly, a primary objective of the present invention is the provision of a bracket assembly for mounting a flat panel TV to the ceiling of the cab and sleeper compartment.

Another objective of the present invention is the provision of a TV mount which allows a flat panel TV to be moved between a raised transport position and a lowered viewing position in a cab and/or sleeper compartment of a truck tractor or cab.

A further objective of the present invention is the provision of a bracket for mounting a flat screen TV monitor in a truck with an adjustable viewing angle for the TV.

Still another objective of the present invention is the provision of a bracket assembly for mounting a TV monitor adjacent the opening between a cab and a sleeper compartment in an over-the-road truck.

Yet another objective of the present invention is the provision of a bracket assembly for mounting a TV in the sleeper compartment of a semi-truck without interfering with the ceiling light in the cab of the truck.

Another objective of the present invention is the provision of a bracket assembly for mounting a TV in a truck for viewing by occupants in a sleeper compartment bunk bed.

A further objective of the present invention is the provision of a TV bracket mounting assembly which is quick and easy to install in the cab of an over-the-road truck, and which is durable and safe in use.

These and other objectives will become apparent from the following description of the invention.

DETAILED DESCRIPTION OF THE PREFERRED EMBODIMENTS

Figure 1:
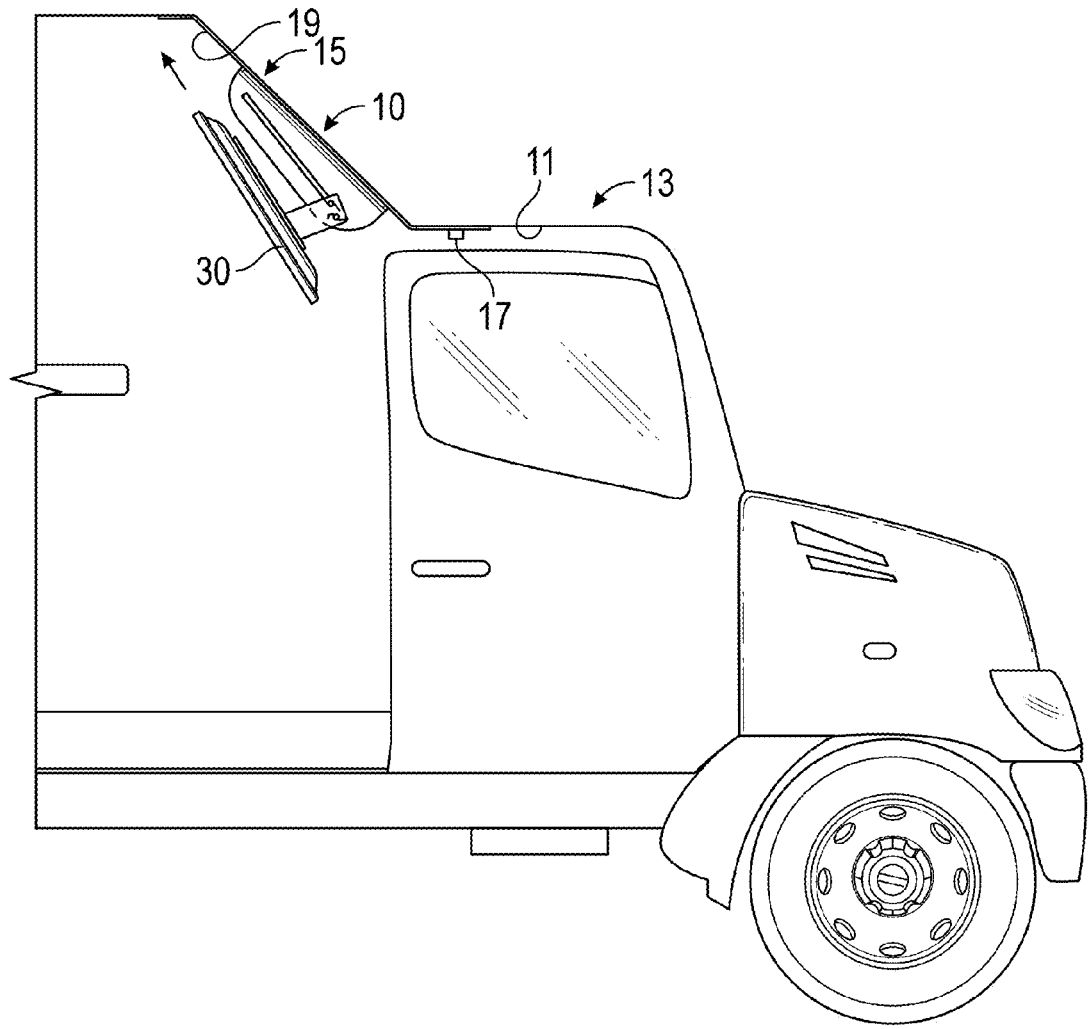
FIG. 1 is a schematic view of an over-the-road truck having the TV mounting bracket assembly of the present invention.
Figure 2:
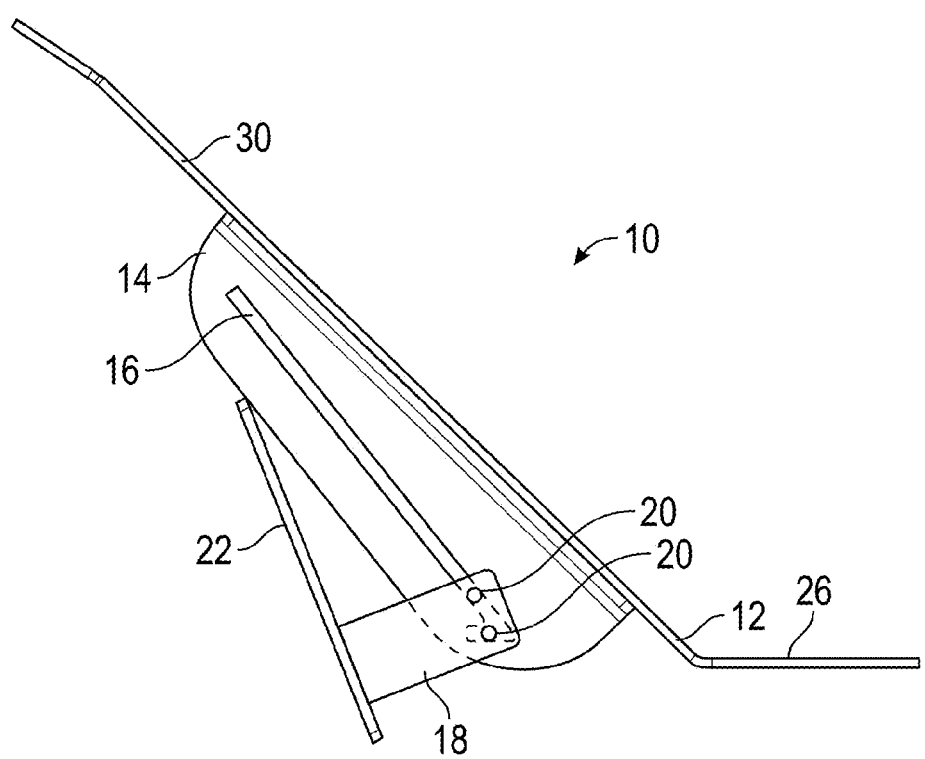
FIG. 2 is a side elevation view of the bracket assembly in a lowered position.
Figure 6:
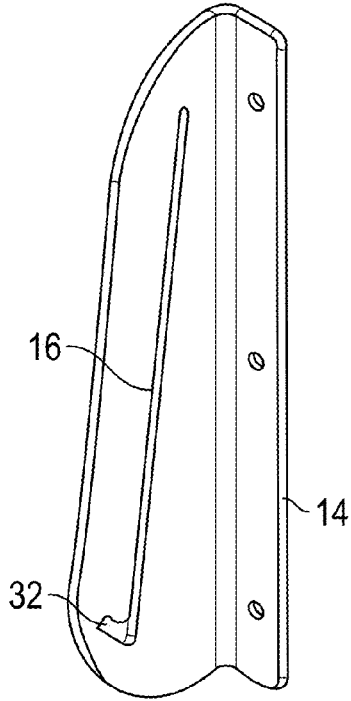
FIG. 6 is a perspective view of the flange of the bracket assembly.
Figure 7:
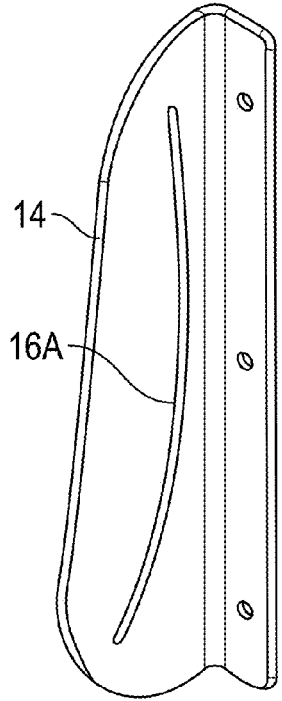
FIG. 7 is a perspective view of an alternative embodiment of the flange for the bracket assembly.

The TV mounting bracket of the present invention is generally designated in the drawings by the reference numeral 10. The bracket assembly 10 includes a base 12 with an L-shaped flange 14 secured to the base in any convenient manner, such as by welding or with nuts and bolts. The flange 14 includes an elongated slot 16, which may be substantially straight, (as shown in the FIGS. 2, 3 and 6), or may be curved, as shown in FIG. 7. An arm 18 is bolted or pinned to the flange 14 for movement along the slot 16. Bolts 20, wing nuts or other fasteners extend through the arm 18 and the slot 16 and can be loosened to allow the arm 18 to move along the slot 16, and tightened so as to secure the arm in a desired position along the slot and flange 14. Preferably, the fastener is tightened and loosened by hand, without the use of tools. A plate 22 is fixed to the arm 18 by welding or other conventional means. The plate includes four corner holes 24 which match the conventional threaded holes on the back of a flat panel TV for mounting the TV to the plate 22 using conventional threaded bolts or fasteners.

The base 12 includes one or more bends to substantially match the contour of the ceiling 11 in the tractor cab 13 and the front wall of the sleeper compartment 15. In the preferred embodiment shown in the figures, the lower end of the base 12 includes a substantially horizontal portion 26 which can be bolted to the ceiling 11 of the cab 13. The lower end 26 of the base 12 includes a hole 28 so that the bracket assembly 10 can be mounted adjacent the dome light 17 of the cab 13. The dome light hardware extends through the hole 28, such that the dome light 17 and lens are not covered by the bracket assembly 10. The base 12 includes an angled portion 30 which extends into the sleeper compartment 15 and is bolted to the front wall 19 of the sleeper compartment 15.

Figure 3:
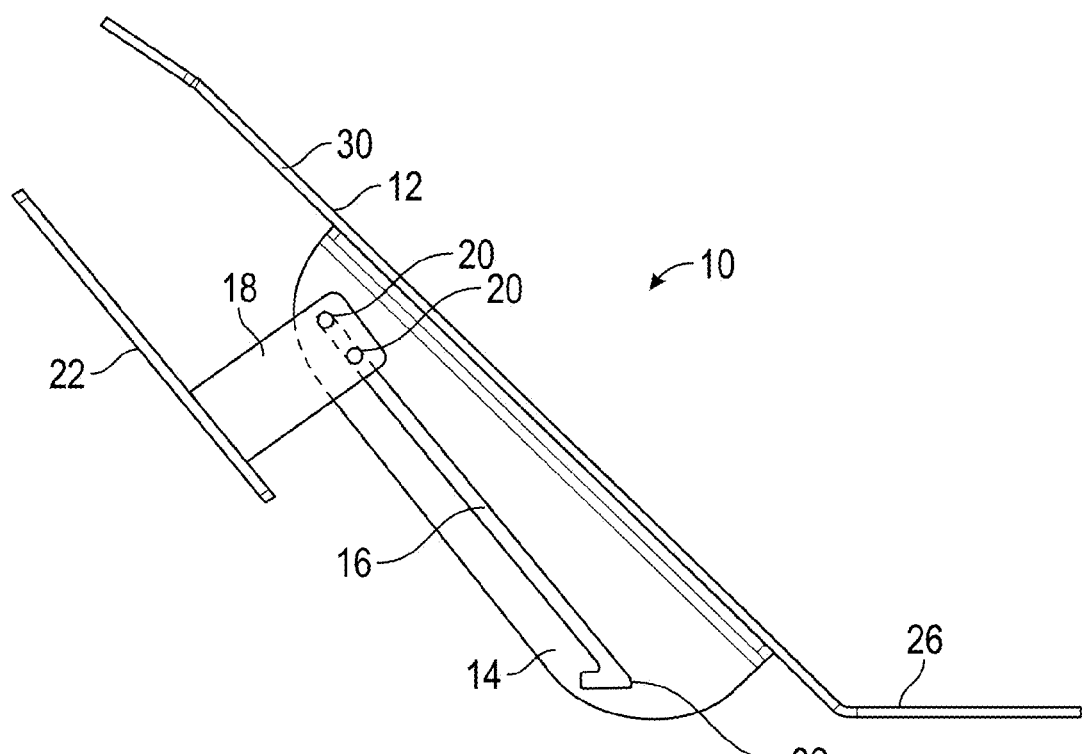
FIG. 3 is a side elevation view of the bracket assembly in a raised position.
Figure 4:
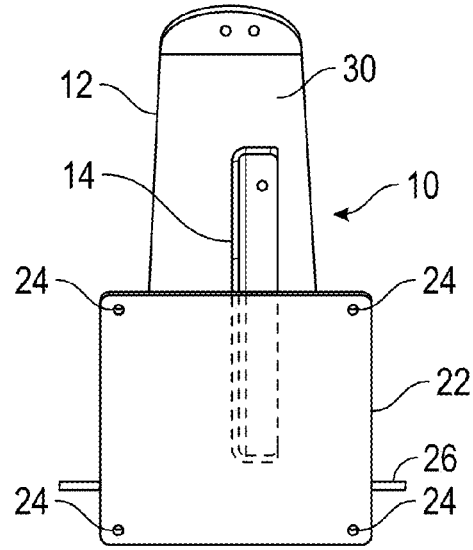
FIG. 4 is a front elevation view of the bracket assembly.
Figure 5:
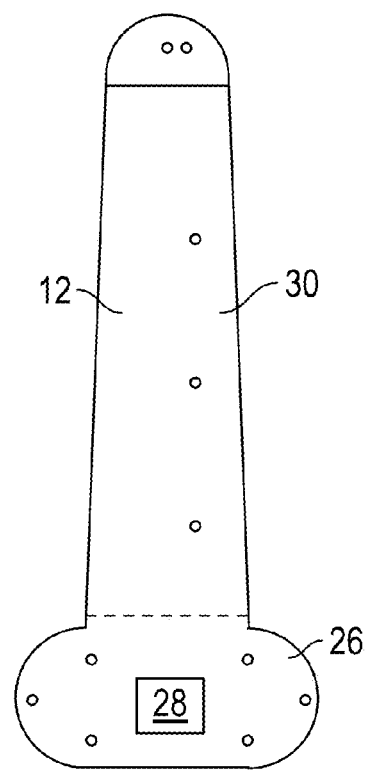
FIG. 5 is a bottom plan view of the base of the bracket assembly.

In use, after the bracket assembly 10 is secured to the ceiling 11 of the truck tractor 13 and the TV monitor 30 is mounted to the plate 22, the TV can be moved between a raised position when not being viewed and a lower position for viewing from inside the sleeper compartment 15. The movement of the TV monitor 30 is accomplished by sliding the arm 18 along the slot 16. As shown in FIGS. 3 and 6, the lower end of the slot 16 has a V-shaped notch 32 which allows the angle of the TV 30 to be adjusted when in the lower position. Alternatively, a curved slot 16A can be provided on the bracket 14, as seen in FIG. 7, to allow the angle of the TV monitor 30 to be adjusted when the monitor is lowered. Moving the TV monitor 30 to the raised position provides increased clearance for entry into and exit from the sleeper compartment 15.

The narrow profile of the flange 14 and arm 18 allows the trucks privacy curtain to be opened and closed without interference. Also, the TV cables can be easily routed around the bracket assembly 10, as needed.

Thus, the bracket assembly 10 provides a simple mounting structure which can be quickly and easily moved between raised and lower positions, without the need for multiple linkages, scissor arms, springs, and other more complex mechanisms.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A bracket assembly for mounting a TV in a truck tractor having a sleeping compartment, comprising:
   a base adapted to be secured to inside the tractor;
   an adjustable arm slidably connected to the base for movement between raised and lowered positions;
   a plate fixed to the arm and having a plurality of holes corresponding to threaded holes in a back panel of the TV;
   the base has an elongated slot and the arm moves along the slot between the raised and lowered positions;
   the slot has a lower end with a notch to permit adjustability of the TV angle;
   whereby the TV can be bolted to the plate and moved with the arm between a raised travel position and a lowered viewing position.

2. A method of mounting a TV in a truck having a cab and a sleeping compartment, comprising:
   securing a bracket to a ceiling of the cab and a front wall of the sleeping compartment;
   extending an arm from the bracket into the sleeping compartment; and
   mounting a flat screen TV to a plate on the arm whereby the TV resides adjacent a passageway between the cab and the sleeping compartment.

3. The method of claim 2 wherein the arm extends rearwardly into the sleeping compartment.

4. The method of claim 2 wherein the arm is adjustable on the bracket.

5. The method of claim 2 further comprising adjusting the arm upwardly and downwardly along the bracket so that the TV can be raised and lowered.

6. The method of claim 2 further comprising moving the arm, plate and TV along a slot in the bracket between raised and lowered positions.

7. The method of claim 6 further comprising fixing the arm, plate and TV in a selected position.

8. In combination, a truck with a cab and sleeper compartment, a flat panel TV monitor, and a mounting bracket, the bracket comprising:
   a base fixed to a ceiling of the cab and extending into the sleeper compartment;
   an arm having opposite first and second ends, with the first end connected to the base; and
   a plate connected to the second end of the arm;
   the TV monitor being secured to the plate for viewing in the sleeping compartment; and
   the arm, plate and TV being slidable along the base between raised and lowered positions.

9. The combination of claim 8 wherein the base includes an elongated slot for adjustable connection of the first end of the arm.

10. The combination of claim 8 wherein the angle of the arm on the base changes at the raised and lowered positions.

11. The combination of claim 8 wherein the base has an opening for mounting the base around a light fixture in the ceiling of the cab.

12. The combination of claim 8 further comprising hand-tightenable fasteners to lock the arm to the base.

13. A bracket assembly for mounting a TV in a truck tractor having a sleeping compartment, comprising;
   a base adapted to be secured to inside the tractor;
   an adjustable arm slidably connected to the base for movement between raised and lowered positions;
   a plate fixed to the arm and having a plurality of holes corresponding to threaded holes in a back panel of the TV;
   the base has an elongated slot and the arm moves along the slot between the raised and lowered positions;
   the base including a horizontal leg and an upwardly inclined leg; and
   whereby the TV can be bolted to the plate and moved with the arm between a raised travel position and a lowered viewing position.

14. The bracket assembly of claim 13 wherein a flange extends substantially perpendicular from the inclined leg and the slot is in the flange.

15. The bracket assembly of claim 13 wherein the angle between the plate and the base is adjustable.

16. The bracket assembly of claim 13 wherein the arm is connected to the base with at least one hand-tightened fastener.

17. A bracket assembly for mounting a TV in a truck tractor having a sleeping compartment, comprising;
   a base adapted to be secured to inside the tractor;
   an adjustable arm slidably connected to the base for movement between raised and lowered positions;
   a plate fixed to the arm and having a plurality of holes corresponding to threaded holes in a back panel of the TV;
   the base having a first end secured in the cab and a second end secured in the sleeping compartment; and
   whereby the TV can be bolted to the plate and moved with the arm between a raised travel position and a lowered viewing position.

18. The bracket assembly of claim 17 wherein the angle between the plate and the base is adjustable.

19. The bracket assembly of claim 17 wherein the arm is connected to the base with at least one hand-tightened fastener.

20. The bracket assembly of claim 17 wherein the first end has an opening to accommodate a light fixture on the ceiling of the cab.

* * * * *